US010778391B2

(12) United States Patent
Bengtsson et al.

(10) Patent No.: US 10,778,391 B2
(45) Date of Patent: Sep. 15, 2020

(54) OPERATING A CELLULAR MIMO SYSTEM

(71) Applicant: Sony Mobile Communications Inc., Tokyo (JP)

(72) Inventors: Erik Bengtsson, Eslöv (SE); Zhinong Ying, Lund (SE)

(73) Assignee: Sony Corporation, Tokyo (JP)

( * ) Notice: Subject to any disclaimer, the term of this patent is extended or adjusted under 35 U.S.C. 154(b) by 16 days.

(21) Appl. No.: 15/042,617

(22) Filed: Feb. 12, 2016

(65) Prior Publication Data

US 2017/0170935 A1 Jun. 15, 2017

(30) Foreign Application Priority Data

Dec. 10, 2015 (WO) ................ PCT/EP2015/079231

(51) Int. Cl.
*H04L 5/00* (2006.01)
*H04B 7/0404* (2017.01)
(Continued)

(52) U.S. Cl.
CPC ......... *H04L 5/0048* (2013.01); *H04B 7/0404* (2013.01); *H04B 7/0413* (2013.01);
(Continued)

(58) Field of Classification Search
CPC .... H04L 5/0048; H04B 7/0413; H04B 7/0619
See application file for complete search history.

(56) References Cited

U.S. PATENT DOCUMENTS 7,372,911 B1 5/2008 Lindskog et al.
2006/0013250 A1* 1/2006 Howard ............... H04B 7/0417 370/465
(Continued)

FOREIGN PATENT DOCUMENTS

EP 2903176 A1 8/2015

OTHER PUBLICATIONS

Atzeni, et al. Fractional Pilot Reuse in Massive MIMO Systems. IEEE ICC workshop. Jun. 8-12, 2015.*
(Continued)

*Primary Examiner* — Jeffrey M Rutkowski
*Assistant Examiner* — Basil Ma
(74) *Attorney, Agent, or Firm* — Tucker Ellis LLP

(57) ABSTRACT

The present application relates to a method for operating a cellular multiple input and multiple output system comprising a first device (20) having at least two antenna arrays (22, 23) and second device having at least two antennas (32, 33). According to the method, a same uplink pilot signal is broadcasted from each antenna (32, 33) of the second device (30) and the same uplink pilot signal is received at each antenna array (22, 23) of the first device (20). At the first device (20), first device transmission parameters are determined for each antenna array (22, 23) depending on the received same uplink pilot signal. Downlink pilot signals are sent via antenna array (22, 23) using the determined first device transmission parameters and the downlink pilot signals are received at each antenna (32, 33) of the second device (30). This second device determines second device receiving parameters for each antenna (32, 33) depending on the received downlink pilot signals.

10 Claims, 2 Drawing Sheets

(51) Int. Cl.

| | |
|---|---|
| ***H04B 7/08*** | (2006.01) |
| ***H04L 25/02*** | (2006.01) |
| ***H04B 7/0413*** | (2017.01) |
| ***H04B 7/06*** | (2006.01) |

(52) U.S. Cl.
CPC ......... *H04B 7/0619* (2013.01); *H04B 7/0862* (2013.01); *H04L 25/0204* (2013.01); *H04L 25/0224* (2013.01); *H04B 7/0613* (2013.01)

(56) References Cited

U.S. PATENT DOCUMENTS

| | | | | |
|---|---|---|---|---|
| 2006/0256761 | A1 | 11/2006 | Meylan et al. | |
| 2008/0151743 | A1* | 6/2008 | Tong ...................... | H04B 1/707 370/204 |
| 2010/0150013 | A1* | 6/2010 | Hara ................... | H04L 25/0224 370/252 |
| 2011/0200143 | A1* | 8/2011 | Koo ..................... | H04B 7/0697 375/299 |
| 2017/0104568 | A1* | 4/2017 | Nasiri Khormuji . | H04B 7/0413 |

OTHER PUBLICATIONS

International Search Report and Written Opinion; dated Jul. 22, 2016; issued in International Patent Application No. PCT/EP2015/079231.

Communication Pursuant to Article 94(3) EPC from counterpart European Patent Application No. 15 807 922.8, dated Jun. 17, 2019.

* cited by examiner

OPERATING A CELLULAR MIMO SYSTEM

FIELD OF THE INVENTION

The present invention relates to cellular communication systems, in particular, to methods and devices for operating a cellular multiple-input and multiple-output (MIMO) system.

BACKGROUND OF THE INVENTION

The popularity of mobile data and voice communication continues to grow. The increasing popularity of data and voice communication requires that communication needs of a large number of users must be met, even in situations in which a large number of users are located within a small area, a case referred to as dense crowd scenario in the art. Typical examples include sports arenas, shopping malls or large office buildings.

In order to increase data transmission performance and reliability, the so-called multiple-input and multiple-output (MIMO) technology may be used in a wireless radio telecommunication system for transmitting information between a base station and a user equipment, for example mobile devices like mobile telephones, mobile computers and tablet computers and stationary devices like personal computers or cash registers.

MIMO systems may use multiple send and receive antennas for wireless communication at a base station as well as at the user equipment. The MIMO technology forms the basis for coding techniques which use the temporal as well as the spatial dimension for transmitting information. The enhanced coding provided in MIMO systems allows a spectral and energy efficiency of the wireless communication to be increased.

The spatial dimension may be used by spatial multiplexing. Spatial multiplexing is a transmission technique in MIMO wireless communication to transmit independent and separately encoded data signals, so-called streams, from each of the multiple transmit antennas. Therefore, the space dimension is reused, or multiplexed, more than one time.

If the transmitter is equipped with Nt antennas and the receiver has Nr antennas, the maximum spatial multiplexing order Ns (the number of streams or the rank) is Ns=min (Nt, Nr). This means that Ns streams can be transmitted in parallel, ideally leading to an Ns increase of the spectral efficiency (the number of bits per second and per Hz that can be transmitted over the wireless channel). For example, a MIMO system with a base station having two antennas and a user equipment having two antennas has a rank of 2 and is also called 2×2 MIMO, indicating the number of antennas at the base station and at the user equipment. However, the rank is limited by the device having the lower number of antennas, typically the user equipment.

In a so-called massive MIMO system, the base station may include a large number of antennas, for example several tens or even in excess of one hundred antennas with associated receiver circuitry. The extra antennas of the massive MIMO base station allow radio energy to be spatially focussed in transmissions as well as a directional sensitive reception which improves spectral efficiency and radiated energy efficiency.

In order to adapt the transmit signal at each individual antenna of the base station in accordance with the currently active receiving user equipment, a base station logic needs information about radio channel properties between the user equipment and the antennas of the base station. Vice versa, in order to adapt the transmit signal at each individual antenna of the user equipment, a user equipment logic need information about the radio channel properties between the base station and the antennas of the user equipment.

A pilot signalling scheme can be used for this purpose which allows the base station to set configuration antenna parameters for transmitting signals, so as to focus radio energy at the user equipment or for receiving radio signals from the user equipment. Likewise, the pilot signalling scheme can be used to enable the user equipment to set configuration antenna parameters for transmitting signals, so as to focus radio energy at the base station, or for receiving radio signals from the base station.

Thus, focus may mean both phase align contributions with different path length and transmit only in directions that will reach the user equipment and base station, respectively. In a conventional MIMO system, training sequences may be transmitted from all user equipment within the cell and possibly also neighbouring cells in a time slot which is dedicated to the respective user equipment. The training sequences need to be orthogonal in order for the base station to identify the configuration parameters for the plurality of antennas for each of the one of the user equipment in conventional systems. Orthogonality may be achieved by using time division multiple access (TDMA), code division multiple access (CDMA) or frequency division multiple access (FDMA) technologies or a combination thereof.

In case the MIMO system uses time division multiple access (TDMA), each user equipment can transmit a pilot signal in an assigned time slot, which can be received by the antennas of the base station and analysed by the base station logic. It will be appreciated that time slots are one example of orthogonal channels, with orthogonality being attained in the time domain. In order to not interfere with each other, a certain time period can be assigned in each system frame where each user equipment may transmit its pilot signal. The pilot signals may each include a training sequence with the pilot signal received at the plurality of antennas of the base station being analysed by the base station logic. Information about a radio channel property of the radio channel between the user equipment and the plurality of antennas may be obtained as a result of the analysis. The base station may use the results of the analysis to determine configuration parameters for transmitting signals via the antennas to the respective user equipment. Vice versa, the base station can transmit a pilot signal in an assigned timeslot, which can be received by the antennas of the user equipment and analysed by the user equipment logic to obtain a radio channel property of the radio channel between the base station and the antennas of the user equipment. The user equipment may use the results to determine configuration parameters for transmitting signals via its antennas to the base station.

Massive MIMO systems (MaMi) may be deployed in buildings such as office buildings, shopping malls, sports arenas or other areas in which a large density of users can occur. In such environments, a large number of user equipment devices may be located in a cell served by the MIMO base station. The time required for the pilot signalling of the user equipment in each frame may increase with the number of user equipment devices. For a large number of user equipment devices, the time required for all user equipment devices to transmit their pilot signals may exceed the available pilot signalling time in each frame. While the pilot signalling time, i.e. the number of time slots allocated to the pilot signalling, may be adjusted dynamically, the transmission of payload data would be negatively effected if the pilot signalling time was increased too much. Therefore, the resources for transmitting pilot signals are limited.

The pilot signals are send from the user equipment to the MIMO base station, i.e., in the uplink direction. Likewise, pilot signals may be sent from the MIMO base station to the user equipment, i.e., in the downlink direction. Therefore, uplink and downlink data transmissions are based on the quality of the uplink and downlink pilot signals. If there is interference during the pilot signal transmission, both uplink and downlink would be effected. The interference may originate from neighbour cells. Furthermore, for mobility reasons, the validity of the channel as defined by the configuration parameters is limited. A new pilot signal needs to be transmitted at regular terms, for example at about every millisecond. Therefore, the transmission of pilot signals requires a considerable amount of resources. In order to keep the ratio between payload and pilot signal overhead large, the number of orthogonal pilot channels needs to be kept as small as possible.

SUMMARY OF THE INVENTION

In view of the above, there is a need in the art for methods and devices which address at least some of the above short comings of conventional MIMO systems. There is in particular a need in the art for improving operation of a multiple-input and multiple-output (MIMO) system during pilot signalling such that resources for pilot signalling are saved and less interference may occur.

According to the present invention, this object is achieved by the features of the independent claims. The dependent claims define preferred and advantageous embodiments of the invention.

According to the present invention, a method for operating a cellular multiple-input and multiple-output, MIMO, system is provided. The cellular MIMO system comprises a first device, for example a base station, having at least two antenna arrays and a second device, for example a user equipment, having at least two antennas. Each antenna array of the at least two antenna arrays comprises a plurality of antennas. According to the method, a same uplink pilot signal is broadcasted from each antenna of the at least two antennas of the second device. The same uplink pilot signal from the second device is received at each antenna array of the at least two antenna arrays of the first device. The first device determines first device transmission parameters for each antenna array of the at least two antenna arrays depending on the received same uplink pilot signal. By using the determined first device transmission parameters, the first device sends downlink pilot signals via each antenna array of the at least two antenna arrays. The downlink pilot signals are received at each antenna of the at least two antennas of the second device, and the second device determines second device receiving parameters for each antenna of the at least two antennas depending on the received downlink pilot signals.

In case the first device is a base station and the second device is a user equipment, according to the above described method, the same uplink pilot signal is broadcasted from each antenna of the at least two antennas of the user equipment and is received at each antenna array of the at least two antenna arrays of the base station. The base station determines first device transmission parameters for each antenna array depending on the received same uplink pilot signal. By using the determined first device transmission parameters, the base station sends downlink pilot signals via each antenna array. The downlink pilot signals are received at each antenna of the user equipment, and the user equipment determines second device receiving parameters for each antenna depending on the received downlink pilot signals.

However, the roles of the first device and the second device may be vice versa, i.e., the first device is a user equipment and the second device is a base station. It is to be noted that in this case, the term "uplink" relates to a communication from the base station to the user equipment and the term "downlink" relates to the opposite communication direction from the user equipment to the base station. Providing the at least two antenna arrays at the user equipment may be in particular advantageous in connection with a user equipment operating at higher frequencies, for example above 20 GHz. In this case, the base station may focus the energy into more or less static sectors and a dynamic operation, i.e. focusing and directing, is performed in the user equipment.

Additionally, the first and second device may be both user equipment devices, for example in a relay configuration or in a device-to-device communication.

Furthermore, the term "antenna" may indicate an antenna structure or an antenna port to which multiple antenna elements may be coupled.

The at least two antenna arrays of the first device may be arranged spatially separated. In case the first device is a base station, the antenna arrays may be separated in a distance of up to a few metres, for example in a distance of 1 to 5 m, if the at least two antenna arrays are arranged at the same base station. Furthermore, the at least two antenna arrays may be distributed over several cooperating base stations. In this case a distance between the antennas may be in a range of up to 100 m, up to 1000 m, or even in excess of 1000 m. In case the first device is a user equipment, the at least two antenna arrays may be arranged in a distance of a few centimetre, for example in a distance of 10 to 15 cm, for example one antenna array at a top side and another antenna array a bottom side of the user equipment. By the spatial separation of the antenna arrays of the first device, a higher rank operation is enabled by transmitting different data streams for each of them. There may be at least as many antennas at the second device as the intended rank and therefore the data streams may be separated in the same way as in today's 2×2 MIMO. However, the second device transmits the same uplink pilot signal from all antennas at the same time and each first device antenna array receives the same pilot and uses it to configure the antenna arrays for independent massive MIMO operation. Thus, by using the same uplink pilot signal as described above, a higher rank operation with a single pilot resource is enabled by spatial separation of the antenna arrays of the first device.

Furthermore, by sending downlink pilot signals via the antenna arrays of the first device, for example a base station, using the determined first device transmission parameters, the first device transmits the downlink pilot signals pre-coded to the second device, for example a user equipment. Thus, the downlink pilot signals may be directed and focused to the user equipment from which the uplink pilot signal has been received. Therefore, the downlink pilot signals do not need to be orthogonal versus downlink pilot signals directed to another user equipment in the cell and will therefore not take significant system resources. For example, while sending the downlink pilot signals via the at least two antenna arrays using the determined first device transmission parameters, additionally the same downlink pilot signals may be sent at the same time via the at least two antenna arrays to a further second device (user equipment)

of the cellular MIMO system using further first device transmission parameters determined depending on a further uplink pilot signal received from the further second device (user equipment).

However, the downlink pilot signals sent from the first device may comprise for each antenna array of the at least two antenna arrays a different downlink pilot signal such that the different downlink pilot signals are orthogonal to each other. When the second device has received the downlink pilot signals at its antennas it can separate different data streams which come from each first device antenna array.

According to an embodiment of the invention, the method comprises furthermore sending corresponding payload data via each antenna array of the at least two antenna arrays of the first device using the determined first device transmission parameters. The payload data is received at the at least two antennas of the second device using the determined second device receiving parameters. After the second device has received the downlink pilot signals from the first device at its antennas, it can separate the different data streams from the first device. Therefore, the first device can transmit independent payload data streams to the second device from each antenna array.

Furthermore, according to another embodiment of the present invention, the second device may determine second device transmission parameters for each antenna of the at least two antennas depending on the received downlink pilot signals. In other words, the second device may determine parameters for each antenna such that pre-coded data is transmitted and a plurality of data streams transmitted via the pre-coded data may be separated at the first device.

The uplink pilot signals may comprise for each antenna of the at least two antennas of the second device a different uplink pilot signal such that the different uplink pilot signals are orthogonal to each other. The uplink pilot signals may be received at each antenna array of the at least two antenna arrays of the first device, and the first device may determine first device receiving parameters for each antenna array of the at least two antenna arrays depending on the received uplink pilot signals. Thus, the first device will be capable of separating data streams sent from the different antennas of the second device.

Consequently, according to another embodiment of the present invention, the second device sends via each antenna of the at least two antennas corresponding payload data using the determined second device transmission parameters, and the first device receives the corresponding payload data at the at least two antenna arrays using the determined first device receiving parameters. This enables a higher rank in the uplink direction and therefore a higher data transmission rate in the uplink direction.

Furthermore, according to the present invention, a first device, for example a base station, for a cellular multiple-input and multiple-output (MIMO) system is provided. The first device comprises at least two antenna arrays and a logic coupled to the at least two antenna arrays. Each antenna array of the at least two antenna arrays comprises a plurality of antennas. For example, in a massive MIMO system, each antenna array may comprise for example several tens or in excess of one hundred antennas. The logic is configured to receive the same uplink pilot signal from a second device, for example a user equipment, of the MIMO system at each antenna array of the at least two antenna arrays of the first device. The same uplink pilot signal has been broadcasted from the second device from each antenna of at least two antennas of the second device. Based on the received same uplink pilot signal, the logic determines first device transmission parameters for each antenna array of the at least two antenna arrays. The first device transmission parameters may be determined such that a radio signal transmitted from each antenna array is directed and focused to the second device from which the uplink pilot signal has been received. Thus, each first device antenna array receives the pilot signal and uses it to configure the antennas for independent MIMO operation. Next, the logic sends downlink pilot signals via each antenna array of the at least two antenna arrays using the determined first device transmission parameters. As the downlink pilot signals are pre-coded using the first device transmission parameters, the downlink pilot signals need not to be orthogonal with respect to downlink pilot signals sent to another second device within the same cell and therefore, the same downlink pilot signals may be sent at the same time pre-coded specifically to a plurality of second device devices. Thus the amount of required system resources may be reduced.

As described above, the first device may comprise a base station and the second device may comprise a user equipment. However, the roles of the first device and the second device may be vice versa such that the first device comprises a user equipment and the second device comprises a base station.

According to an embodiment, the first device comprises an antenna system comprising a plurality of antennas. Each antenna array of the at least two antenna arrays comprises a corresponding subset of antennas of the plurality of antennas and the subsets are different. Therefore, there is no need to increase the number of antennas of the first device. Instead, an antenna array of the first device may be divided into sections, each section forming an antenna array which may be used as described above. In a massive MIMO system a gain may then be reduced, but the rank may be increased.

The first device may be configured to perform the above described method and the embodiments thereof. Therefore, the first device also comprises the above described advantages.

Furthermore, according to the present invention, a second device, for example a user equipment, for a cellular multiple-input and multiple-output (MIMO) system is provided. The second device comprises at least two antennas and a logic coupled to the at least two antennas. The logic is configured to broadcast the same uplink pilot signal from each antenna of the at least two antennas. Furthermore, the logic is configured to receive downlink pilot signals at each antenna of the at least two antennas of the second device and to determine second device receiving parameters for each antenna of the at least two antennas depending on the received downlink pilot signals. The downlink pilot signals are sent from at least two antenna arrays of a first device, for example a base station, of the cellular MIMO system. The downlink pilot signals are sent via the at least two antenna arrays using first device transmission parameters, which are determined for each antenna array of the at least two antenna arrays depending on the same uplink pilot signal received from the second device at each antenna array of the at least two antenna arrays of the first device. Therefore, the second device is configured to perform the above-described method or any one of the method's embodiments described above and comprises therefore the above-described advantages.

As described above, the first device may comprise a base station and the second device may comprise a user equipment. However, the roles of the first device and the second device may be vice versa such that the first device comprises a user equipment and the second device comprises a base station.

For example, the user equipment may comprise a mobile telephone, a mobile computer, a tablet computer, a smart wearable device or a smart mobile accessory. A smart mobile accessory or a smart wearable device may comprise a wearable computer, also known as body-borne computer or simply wearable, which is a miniature electronic device that may be worn by a user under, with or on top of clothing.

Furthermore, according to the present invention, a cellular multiple input and multiple output system, a so-called MIMO system, is provided. The MIMO system comprises a first device as described above and at least a second device as described above.

Determining receive and/or transmission parameters as it is defined in the above summary of the present invention, may include analyzing a training sequence of a pilot signal received at the plurality of antennas of the first device or second device for obtaining information about a radio channel property of the radio channel between the antennas of the second device and the antennas of the first device according to MIMO concepts. The first device may use the results of the analysis to determine configuration parameters for transmitting and receiving signals via the antennas to and from the respective second device. The second device may use the results of the analysis to determine configuration parameters for transmitting and receiving signals via its antennas to and from the first device according to MIMO concepts.

Furthermore, although in the above summary of the present invention, reference is primarily made to MIMO systems, the above described methods and devices may in particular be advantageously used in massive MIMO systems (MaMi). In a massive MIMO system, the first device, for example a base station, may include a large number of antennas, for example several tens or even in excess of one hundred antennas with associated receiver circuitry.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
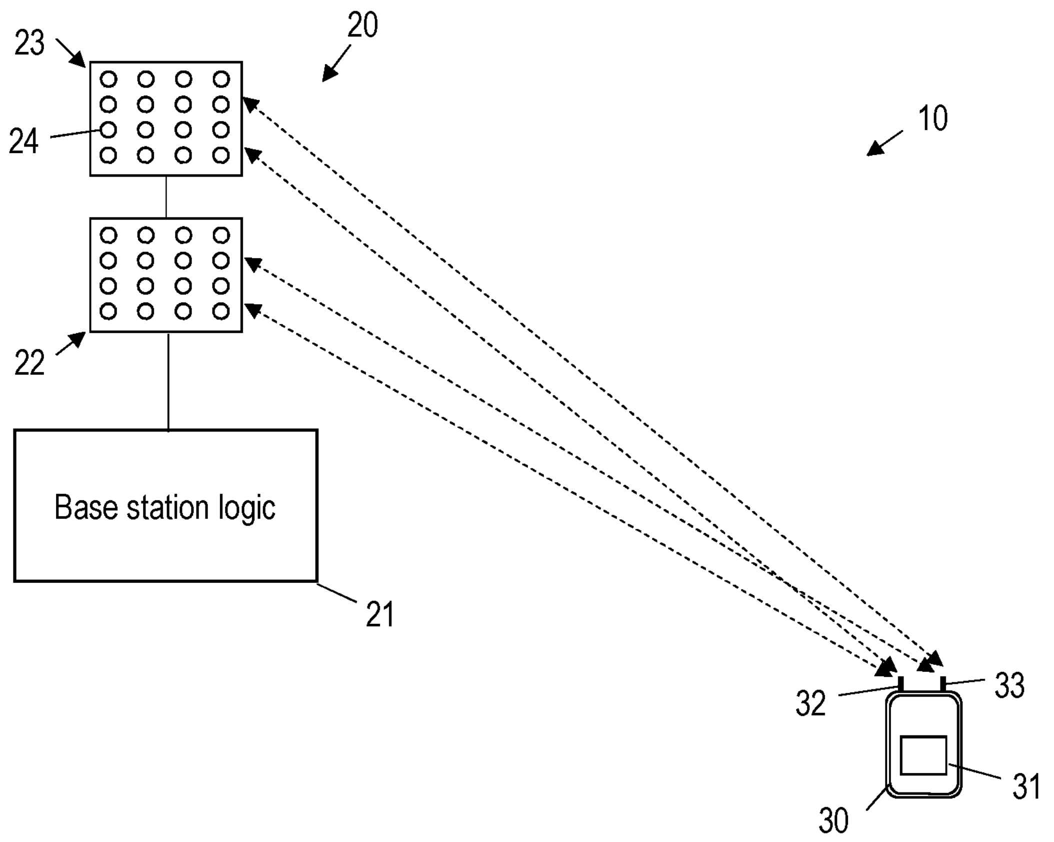
FIG. 1 shows schematically a cellular multiple-input and multiple-output system according to an embodiment of the present invention.

FIG. 1 shows a communication system 10 according to an embodiment. The communication system 10 is a multiple-input and multiple-output (MIMO) system and includes a MIMO base station 20. The MIMO communication system 10 may be a massive MIMO system (MaMi), and the MIMO base station 20 may have a large number of antennas, for example several tens or in excess of one hundred antennas.

The base station 20 comprises a plurality of antennas which are indicated by circles in FIG. 1. One exemplary antenna of the plurality of antennas is referenced by reference sign 24. The antennas 24 may be arranged in a two-dimensional or three-dimensional spatial array on a carrier. The base station 20 may comprise furthermore associated (not shown) transceivers for the antennas 24. The base station 20 may be a base station for a massive MIMO system. Accordingly, the base station 20 may have several tens or in excess of one hundred antennas 24. The plurality of antennas are arranged in two antenna arrays 22, 23. Each antenna array 22, 23 comprises a plurality of antennas of antennas 24. The two antenna arrays 22, 23 may be arranged spaced apart from each other, and the distance between the antenna arrays 22, 23 may be in the range of a few metres, for example in the range of up to 3 m. The base station 20 comprises furthermore a base station logic 21. The base station logic 21 may comprise for example a controller, computer or microprocessor. Although in FIG. 1 only two antenna arrays 22, 23 are shown, the base station 20 may comprise more than two antenna arrays, for example three, four or five or even more, for example several tens of antenna arrays.

In the communication system 10, a plurality of user equipment devices like mobile phones, mobile and stationary computers, tablet computers, smart wearable devices or smart mobile accessories may be arranged. An exemplary user equipment 30 is shown in FIG. 1. The user equipment 30 may be configured to communicate with the base station 20.

The user equipment 30 comprises a plurality of antennas 32, 33 and a logic 31. The logic 31 may comprise for example a controller or microprocessor. The user equipment 30 may comprise more components, for example a graphical user interface and a battery, but these components are not shown in FIG. 1 for clarity reasons. Although in FIG. 1 only two antennas 32, 33 are shown, the user equipment 30 may comprise any number of antennas, for example three, four or even more, for example several tens. The antennas of the user equipment may be arranged spaced apart from each other. For example, the two antennas 32 and 33 may be arranged at a top side of the user equipment 30 near the edges. As an alternative, one or more antennas may be arranged at the top side and some other antennas may be arranged at the bottom side of the user equipment 30. Therefore, the distance between two antennas may be in a range of a few centimetres up to 10 or 15 cm.

Figure 2:
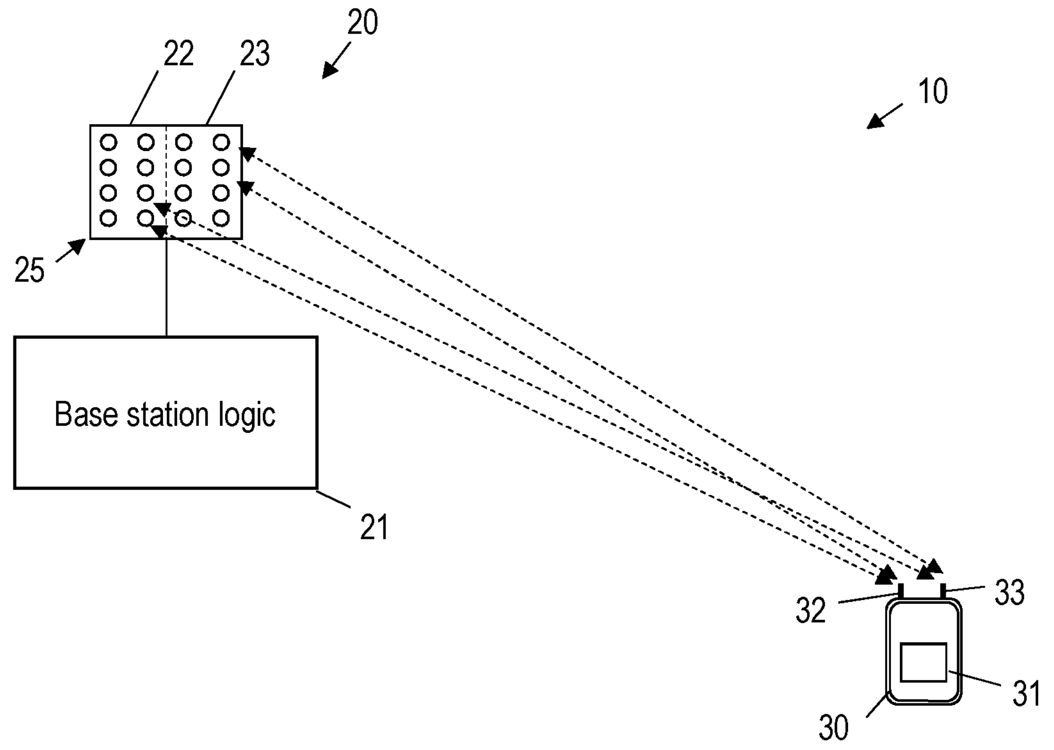
FIG. 2 shows schematically a cellular multiple-input and multiple-output system according to another embodiment of the present invention.

FIG. 2 shows an alternative embodiment of the base station 20. The base station 20 shown in FIG. 2 comprises physically a single antenna array 25 comprising a plurality of antennas indicated as circles. However, the plurality of antennas is divided into two subsets of antennas indicated by the dashed line separating the antennas on the left-hand side from the antennas on the right-hand side. Thus, two logical antenna arrays 22, 23 are formed with the left subset of antennas belonging to antenna array 22 and the right subset of antennas belonging to antenna array 23.

Operation of the base station 20 and the user equipment 30 will be described in more detail in connection with FIG. 3.

Figure 3:
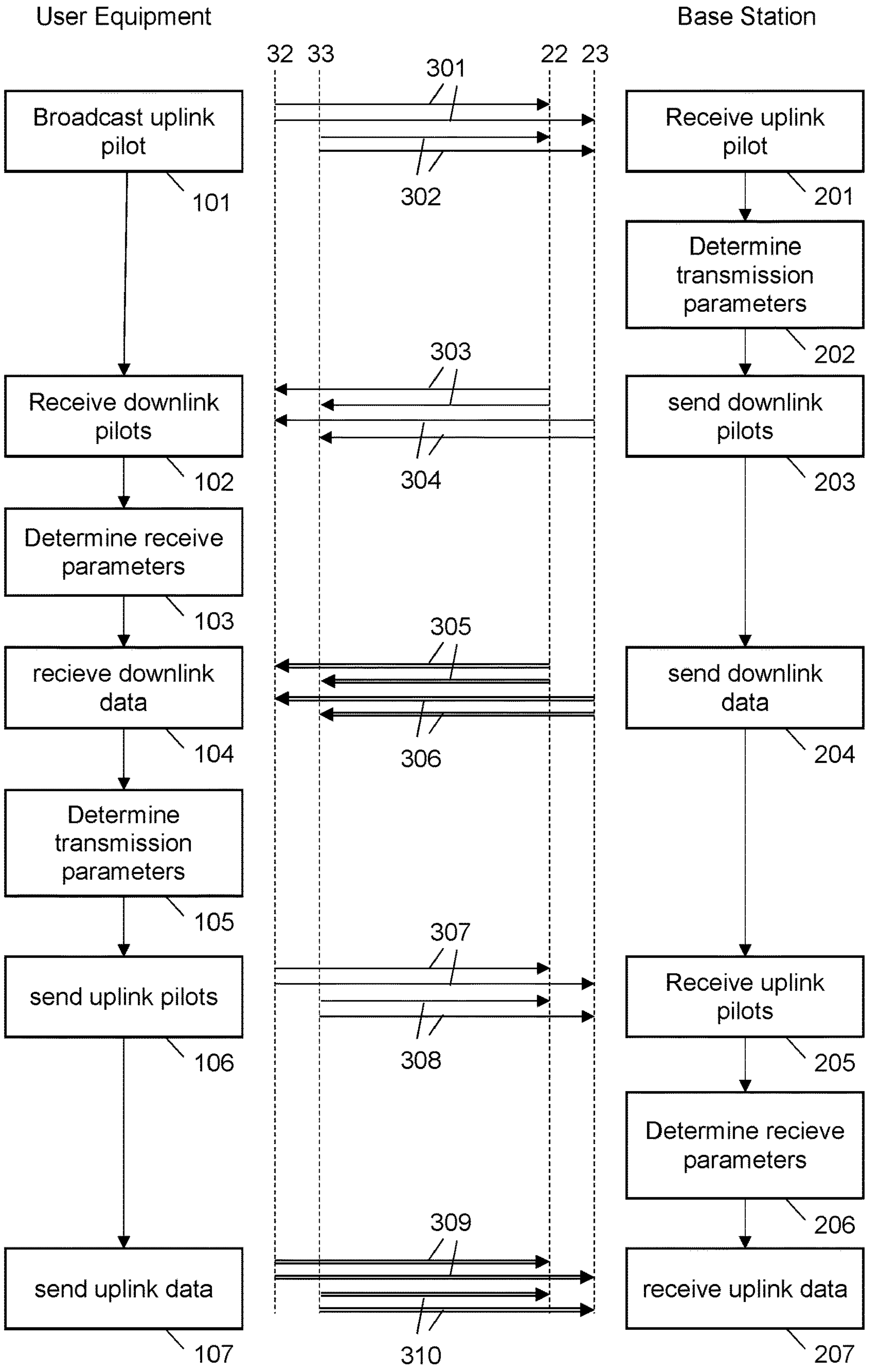
FIG. 3 shows a flow chart comprising method steps according to an embodiment of the present invention.

FIG. 3 shows a flowchart with method steps 101 to 107 performed by the user equipment 30 and method steps 201 to 207 performed by the base station 20. Furthermore, the transmission of radio signals between the antennas 32, 33 of the user equipment 30 and the antenna arrays 22, 23 of the base station 20 is indicated in FIG. 3 by arrows 301 to 310. In particular, dashed line 32 and dashed line 33 represent the antennas 32 and 33 of the user equipment 30 and thus a radio signal transmitted from one of these antennas is indicated by an arrow starting at the corresponding dashed line. In the opposite direction, a radio signal received at one of these antennas is indicated by an arrow ending at the corresponding dashed line. Likewise, dashed line 22 and dashed line 23 represent the antenna arrays 22 and 23 of the base station 20. It should be noted that in FIG. 3 an arrow formed of a single line represents a radio signal transmission of a pilot signal and an arrow formed of a double line represents a radio signal transmission of payload data.

In step 101 the user equipment 30 broadcasts an uplink pilot signal from each antenna 32 and 33. The pilot signal may include a training sequence and may be a MIMO pilot signal. In particular, the same uplink pilot signal is broadcasted via each antenna indicated by arrows 301 and 302. In case the user equipment comprises more than two antennas, the same uplink pilot signal is broadcasted via all these antennas. Broadcasting means that the same pilot signal is sent via the antennas without being focused or directed into a specific direction as it is possible in MIMO systems. However, although the same uplink pilot signal is sent via the antennas, the uplink pilot signal may have a different amplitude for each antenna and/or a different phase for each antenna. Therefore, while broadcasting the same uplink pilot signal via all antennas, no specific parameters for directing or focusing the broadcasted radio signal are used.

In step 201 the base station 20 receives the same uplink pilot signal from the user equipment 30 at each antenna array 22 and 23. In case the base station 20 comprises more than two antenna arrays, the same uplink pilot signal is received at all antenna arrays. It is to be noted that for steps 101 and 201 only one pilot signal resource for transmitting the same pilot signal is required.

In step 202 the base station 20 determines base station transmission parameters for each antenna array 22, 23 at which the same uplink pilot signal was received. It is to be noted that in the appended claims the base station transmission parameters are named first device transmission parameters. The base station transmission parameters are determined such that when they are used during radio signal transmission via the antenna arrays 22, 23, they configure the antenna arrays 22, 23 for independent MIMO operation.

For example, the base station 20 is configured to analyse the pilot signal received at the antenna arrays 22, 23 to determine corresponding channel characteristics for radio signal transmissions between each antenna array 22, 23 and the user equipment 30. The logic 21 of the base station 20 may be configured to determine a footprint matrix for each antenna array 22, 23 based on the pilot signal received at the corresponding antenna array 22, 23 from the user equipment 30. The logic 21 may use the footprint matrix to control the plurality of antennas 24 of the corresponding antenna array 22, 23 when transmitting radio signals to the user equipment 30. The logic 21 may compute a Hermitian conjugate of the footprint matrix to determine a time delay and amplitudes of radio signals transmitted by each antenna 24 of the corresponding antenna array 22, 23 to focus radio energy in a sector in which the user equipment 30 is located. Vice versa, when the base station 20 is receiving a radio signal from the user equipment 30, the signals received at each antenna 24 of the corresponding antenna array 22, 23 are filtered, combined and/or delayed such that the radio signal from the user equipment 30 may be received with a large amplitude and signal to noise ratio.

The MIMO system 10 may use a time division multiple access method (TDMA) for the transmission of pilot signals. A pilot time slot may be allocated to each user equipment served by the base station 20. In the allocated pilot time slot the respective user equipment may transmit its pilot signal. The allocation in the time domain ensures that the various user equipment devices do not interfere with each other when transmitting the pilot signals. However, other orthogonal transmission methods may be used for transmitting the pilot signals, for example a frequency division multiple access (FDMA) or a code division multiple access (CDMA) method.

Returning to FIG. 2, the base station sends in step 203 orthogonal downlink pilot signals via each antenna array 22, 23 using the determined base station transmission parameters. In detail, a first pilot signal indicated by arrows 303 is transmitted from antenna array 22 to the user equipment 30, where it is received at both antennas 32 and 33 (step 102). By analysing the received first pilot signal, user equipment receive parameters for the antennas 32 and 33 may be determined such that their receive characteristic focuses on antenna array 22 (step 103). The user equipment receive parameters are designated as second device receive parameters in the appended claims. A second pilot signal indicated by arrows 304 is transmitted from antenna array 23 to the user equipment 30. The second pilot signal is orthogonal to the first pilot signal. The second pilot signal is received at both antennas 32 and 33 (step 102). Due to the orthogonality of the first pilot signal and the second pilot signal, the user equipment 30 may determine the user equipment receive parameters for the antennas 32 and 33 by analysing the received second pilot signal such that receive characteristics of the antennas 32 and 33 may focus on antenna array 23 (step 103).

As a result, the user equipment 30 can now separate different data streams from the base station antenna arrays. Therefore, the base station 20 can transmit independent data streams to the user equipment 30 from the two antenna arrays 22, 23. It is to be noted that the first and second orthogonal pilot signals will essentially not be received by other user equipment devices in the same cell as the first and second pilot signals are transmitted using the base station transmission parameters. Due to the focusing effect of the base station transmission parameters they will be received essentially by the dedicated user equipment 30 only. Therefore, these pilot signals may be reused in the same cell for serving another user equipment and therefore resources for pilot signals may be saved.

In view of the above, a rank 2 downlink communication may be accomplished. For example, the base station 20 may send first downlink payload data (indicated by arrows 305) via antenna array 22 using the corresponding base station transmission parameters to the user equipment 30 (step 204). At the same time, the base station 20 may send second downlink payload data (indicated by arrows 306) via antenna array 23 using the corresponding base station transmission parameters to the user equipment 30 (step 204). The first and second downlink payload data is received at the antennas 32, 33 of the user equipment 30 using the determined user equipment receiving parameters (step 104). As the user equipment 30 can separate different data streams from the base station antenna arrays, the first and second downlink payload data can be received independently from the two antenna arrays 22, 23 at the user equipment 30.

Furthermore, the user equipment 30 may determine in step 105 user equipment transmission parameters for each antenna 32, 33 based on the downlink pilot signals received in step 102. In the claims, these user equipment transmission parameters are named the second device transmission parameters. Based on the user equipment transmission parameters, the user equipment 30 may send orthogonal uplink pilot signals via each antenna 32, 33 focused and directed to the base station 20.

For example, a first uplink pilot signal indicated by arrows 307 is transmitted from antenna 32 to the base station 20, where it is received at both antenna arrays 22 and 23 (step 205). By analysing the received first uplink pilot signal, base station receive parameters for the antenna arrays 22 and 23 may be determined such that their receive characteristic focuses on antenna 32 (step 206). The base station receive parameters are named first device receive parameters in the appended claims. A second uplink pilot signal indicated by arrows 308 is transmitted from antenna 33 to the base station 20. The second uplink pilot signal is orthogonal to the first uplink pilot signal. The second uplink pilot signal is received at both antenna arrays 22 and 23 (step 205). Due to the orthogonality of the first uplink pilot signal and the second uplink pilot signal, the base station 20 may determine base station receive parameters for the antenna arrays 22 and 23 by analysing the received second uplink pilot signal such that receive characteristics of the antenna arrays 22 and 23 may focus on antenna 33 (step 206).

Consequently, the base station 20 is able to determine which signal comes from which user equipment antenna. Therefore, the user equipment 30 can transmit independent data streams to the base station 20 from the two antennas.

Depending on the number of antennas of the user equipment, the first and second orthogonal uplink pilot signals are focused and directed to the base station. With only two antennas, there may be not too much focusing. However, with some more antennas, e.g. ten or more antennas the first and second orthogonal uplink pilot signals may be focused on the base station 20 and will essentially not be received by other base stations near the user equipment. Therefore, these pilot signals may be reused in a neighbouring cell and therefore resources for pilot signals may be saved.

Thus, a rank 2 uplink communication may be accomplished. For example, the user equipment 30 may send first uplink payload data (indicated by arrows 309) via antenna 32 using the corresponding user equipment transmission parameters to the base station 20 (step 107). At the same time, the user equipment 30 may send second uplink payload data (indicated by arrows 310) via antenna 33 using the corresponding user equipment transmission parameters to the base station 20 (step 107). The first and second uplink payload data is received at the antenna arrays 22, 23 of the base station 20 using the determined base station receiving parameters (step 207). As the base station 20 can determine which signal comes from which user equipment antenna, the first and second uplink payload data can be received independently from the two antennas 32, 33 at the base station 20.

To sum up, according to the method described above, the user equipment transmits the same uplink pilot signal from its antennas at the same time. Each base station antenna array receives the same pilot signal and uses it to configure the antenna arrays for independent MIMO operation. The base station transmits orthogonal pre-coded pilot signals from each antenna array to the user equipment. Pre-decoded means that the pilot signals are transmitted using the MIMO configuration to direct the pilot signals to the user equipment. When the user equipment has received the different downlink pilot signals at both antennas, it can separate different data streams from the base station antenna arrays. Now the base station can transmit independent data streams to the user equipment from the antenna arrays. The user equipment may also transmit orthogonal uplink pilot signals received at the base station pre-coded. This enables the base station of separating data streams from the different antennas such that independent data streams may be transmitted from the user equipment to the base station.

Although in the above description the user equipment 30 comprises only two antennas 32 and 33, and the base station 20 comprises only two antenna arrays 22 and 23, the above-described principle may be extended easily to a higher rank. Furthermore, each antenna of the user equipment may comprise a plurality of antenna elements which are controlled via a corresponding antenna port.

The above-described method may be performed with swapped roles, that means that the user equipment comprises the at least two antenna arrays and the base station comprises the at least two antennas. Consequently, the method starts with sending the same pilot signal from each antenna of the at least two antennas of the base station. The same pilot signal from the base station is received at each antenna array of the at least two antenna arrays of the user equipment. The user equipment determines user equipment transmission parameters for each antenna array depending on the received same pilot signal. By using the determined user equipment transmission parameters, the user equipment sends orthogonal pilot signals via each antenna array. The orthogonal pilot signals are received at each antenna of the at least two antennas of the base station, and the base station determines base station receiving parameters for each antenna depending on the received orthogonal pilot signals.

This reversed method may in particular the advantageous at higher transmission frequencies, for example at transmission frequencies above 20 GHz. In this case, the antennas of the base station may focus the energy into static sectors and the user equipment adapts its antenna arrays dynamically depending on transmission characteristics between the base station and the user equipment.

The invention claimed is:

1. A method for operating a cellular multiple-input and multiple output (MIMO) system, the cellular MIMO system comprising a base station having at least two antenna arrays, each antenna array of the at least two antenna arrays comprising a plurality of antennas, and a user equipment (UE) comprising at least two antennas, the method comprising:

broadcasting a same uplink pilot signal from each antenna of the at least two antennas of the UE at the same time in one pilot signal resource, receiving uplink signals from the UE at each antenna array of the at least two antenna arrays of the base station, wherein the uplink signals result from the same uplink pilot signal being broadcasted from each antenna of the at least two antennas of the UE, determining, at the base station, base station transmission parameters for each antenna array of the at least two antenna arrays depending on the received uplink signals, sending downlink pilot signals via each antenna array of the at least two antenna arrays using the determined base station transmission parameters, receiving the downlink pilot signals at each antenna of the at least two antennas of the UE, determining, at the UE, UE receiving parameters for each antenna of the at least two antennas depending on the received downlink pilot signals, wherein the downlink pilot signals comprise for each antenna array of the at least two antenna arrays a different downlink pilot signal, the different downlink pilot signals being orthogonal to each other, determining, at the UE, UE transmission parameters for each antenna of the at least two antennas depending on the received downlink pilot signals, and sending uplink pilot signals via each antenna of the at least two antennas of the UE using the determined UE transmission parameters.

2. The method according to claim 1, further comprising:

sending via each antenna array of the at least two antenna arrays of the base station corresponding payload data using the determined base station transmission parameters, and receiving the payload data at the at least two antennas of the UE using the determined UE receiving parameters.

3. The method according to claim 1, further comprising:

receiving the uplink pilot signals at each antenna array of the at least two antenna arrays of the base station, and determining, at the base station, base station receiving parameters for each antenna array of the at least two antenna arrays depending on the received uplink pilot signals.

4. The method according to claim 3, wherein the uplink pilot signals comprise for each antenna of the at least two antennas a different uplink pilot signal, the different uplink pilot signals being orthogonal to each other.

5. The method according to claim 3, further comprising:

sending via each antenna of the at least two antennas of the UE corresponding payload data using the determined UE transmission parameters, and receiving the corresponding payload data at the at least two antenna arrays of the base station using the determined base station receiving parameters.

6. The method according to claim 1, wherein the user equipment comprises at least one device of a group comprising:

a mobile telephone, a mobile computer, a tablet computer, a wearable device, and a mobile accessory.

7. A device for a cellular multiple-input and multiple-output (MIMO) system, the device comprising:

at least two antenna arrays, each antenna array of the at least two antenna arrays comprising a plurality of antennas, and a logic coupled to the at least two antenna arrays and configured to receive uplink signals from a user equipment (UE) of the MIMO system at each antenna array of the at least two antenna arrays of the device, wherein the uplink signals result from the same uplink pilot signal being broadcasted from the UE from each antenna of at least two antennas of the UE at the same time in one pilot signal resource, determine device transmission parameters for each antenna array of the at least two antenna arrays depending on the received uplink signals, and send downlink pilot signals via each antenna array of the at least two antenna arrays using the determined device transmission parameters; and wherein the downlink pilot signals comprise for each antenna array of the at least two antenna arrays a different downlink pilot signal, the different downlink pilot signals being orthogonal to each other.

8. The device according to claim 7, wherein the device comprises an antenna system comprising a plurality of antennas, wherein each antenna array of the at least two antenna arrays comprises a corresponding subset of antennas of the plurality of antennas, wherein the subsets are different.

9. A device for a cellular multiple-input and multiple-output (MIMO) system, the device comprising:

at least two antennas, and a logic coupled to the at least two antennas and configured to broadcast a same uplink pilot signal from each antenna of the at least two antennas at the same time in one pilot signal resource, receive downlink pilot signals at each antenna of the at least two antennas of the device, the downlink pilot signals being sent from at least two antenna arrays of a base station of the cellular MIMO system using base station transmission parameters, the base station transmission parameters being determined at the base station for each antenna array of the at least two antenna arrays depending on uplink signals received from the device at each antenna array of the at least two antenna arrays of the base station, wherein the uplink signals result from the same uplink pilot signal being broadcasted from each antenna of the at least two antennas of the device, and determine device receiving parameters for each antenna of the at least two antennas depending on the received downlink pilot signals;

wherein the downlink pilot signals comprise for each antenna array of the at least two antenna arrays a different downlink pilot signal, the different downlink pilot signals being orthogonal to each other, determine device transmission parameters for each antenna of the at least two antennas depending on the received downlink pilot signals, and send uplink pilot signals via each antenna of the at least two antennas of the device using the determined device transmission parameters.

10. A cellular multiple-input and multiple-output (MIMO) system, comprising:

a first device which is a device according to claim 7, and a user equipment (UE) comprising:

at least two antennas, and a logic coupled to the at least two antennas and configured to broadcast the same uplink pilot signal from each antenna of the at least two antennas at the same time in one pilot signal resource, receive downlink pilot signals at each antenna of the at least two antennas of the device, the downlink pilot signals being sent from at least two antenna arrays of the first device, and determine device receiving parameters for each antenna of the at least two antennas depending on the received downlink pilot signals.

* * * * *